United States Patent [19]

Fischer et al.

[11] Patent Number: 4,632,819
[45] Date of Patent: Dec. 30, 1986

[54] PROCESS FOR REMOVING HYDROGEN SULFIDE FROM EXHAUST GAS AND FOR PRODUCING SULFUR BY THE CLAUS PROCESS

[75] Inventors: Herbert Fischer, Lollar; Manfred Kriebel, Frankfurt am Main, both of Fed. Rep. of Germany

[73] Assignee: Metallgesellschaft AG, Frankfurt, Fed. Rep. of Germany

[21] Appl. No.: 726,594

[22] Filed: Apr. 23, 1985

[30] Foreign Application Priority Data

Apr. 27, 1984 [DE] Fed. Rep. of Germany ....... 3415722

[51] Int. Cl.$^4$ ...................... B01D 53/36; C01B 17/04
[52] U.S. Cl. .............................................. 423/574 R
[58] Field of Search ................ 423/574 R, 574 G, 576

[56] References Cited

U.S. PATENT DOCUMENTS

| 2,413,714 | 1/1947 | Keeling | 423/576 |
| 3,531,251 | 9/1970 | Brogdon | 423/574 R |
| 3,681,024 | 8/1972 | Hujsak et al. | 423/574 G |
| 3,860,697 | 1/1975 | Palm | 423/574 G |

Primary Examiner—John Doll
Assistant Examiner—Jeffrey E. Russel
Attorney, Agent, or Firm—Karl F. Ross; Herbert Dubno

[57] ABSTRACT

The feed gas is partially burnt with oxygen-containing gas in a thermal Claus process plant, in which temperatures in the range of 850° to 1350° C. is maintained. Product gas which has been produced is passed through a catalytic Claus process plant (Claus catalysis plant), from which sulfur is withdrawn. The exhaust gas from the Claus catalysis plant is supplied to a desulfurizing plant. The sulfur compounds in the exhaust gas of the desulfurizing plant are converted to SO$_2$ in a thermal aftertreating unit. When the rate of the H$_2$S-containing feed gas is below a limit, which is between 20 to 35% of the total rate of feed gas permissible for the thermal Claus process plant, then recycled exhaust gas from the desulfurizing plant (recycle gas) is admixed to the feed gas at such a rate that the rate of the mixed feed and recycle gases exceeds that limit. The recycle gas is suitably heated to 200° to 400° C. before it is mixed with the feed gas.

6 Claims, 2 Drawing Figures

PROCESS FOR REMOVING HYDROGEN SULFIDE FROM EXHAUST GAS AND FOR PRODUCING SULFUR BY THE CLAUS PROCESS

FIELD OF THE INVENTION

Our present invention relates to a method of removing $H_2S$ from a gas containing a relatively high concentration of $H_2S$, e.g from a metallurgical plant or from an adsorber, or the like. More particularly, this invention relates to the removal of the $H_2S$ from a gas and the recovery of the sulfur content thereof as high-grade elemental sulfur.

BACKGROUND OF THE INVENTION

Hydrogen sulfide can be removed from an $H_2S$-containing feed gas by the Claus process for producing elemental sulfur, wherein the feed gas is partially burnt with oxygen-containing gas in a thermal Claus process plant having at least one combustion chamber, wherein temperatures in the range of 850° to 1350° C. are maintained. The resulting process gas is passed through a catalytic Claus process plant (Claus catalysis plant), from which sulfur is withdrawn. The exhaust gas from the Claus catalysis plant is supplied to a desulfurizing plant in which the sulfur compounds contained in the exhaust gas from the desulfurizing plant are converted to $SO_2$ by a thermal aftertreatment, and an $SO_2$-containing exhaust gas is produced. Small quantities of other sulfur compounds, such as COS, $CS_2$ and methyl mercaptans, are also removed by the process.

That process and equipment for carrying out the process have been described in detail in *Ullmanns Enzyklopadie der Technischen Chemie*, 4th edition (1982), vol. 21, pp 8 to 26. In the thermal Claus process plant the $H_2S$-containing feed gas is burnt with air or oxygen-enriched air to produce a mixture of $H_2S$ and $SO_2$; a molar ratio of 2:1 of the two components is desired in that step.

In the Claus catalysis plant, the reaction is $2H_2S + SO_2 = 3S + 2H_2O$ to form elemental sulfur and water. $Al_2O_3$ catalysts having surface areas of 200 to 300 $m^2/g$ may be used for that purpose.

The desulfurizing plant may be operated in accordance with any of a number of processes, in which the sulfur compounds are removed by adsorption and/or absorption. The thermal aftertreatment is generally an afterburning, by which all sulfur compounds are converted to sulfur dioxide.

It frequently is necessary to provide a technique which will ensure a satisfactory operation of the units of the plant even if the rate of feed gas varies greatly. It is also desirable to avoid problems which might arise as a result of a temperature drop below the dew point temperature and the solidification temperature of sulfur.

OBJECTS OF THE INVENTION

It is the principal object of the present invention to provide an improved method of removing $H_2S$ from a gas containing same and of recovering the sulfur content thereof as elemental sulfur, in which disadvantages of the earlier systems are avoided, the process is better able to compensate for fluctuations in the feed rate of the $H_2S$-containing gas, and a high quality sulfur product is obtained.

Another object is to provide a process which improves upon the prior process described.

SUMMARY OF THE INVENTION

This is accomplished in accordance with the invention, in a process carried out under the conditions described, in that recycled exhaust gas from the desulfurizing plant (recycle gas) is admixed with the $H_2S$-containing feed gas when the rate of feed of the latter is below a limit in the range of 20 to 35% of the total feed gas rate which is permissible for the thermal Claus process plant, and recycle gas is thus admixed at such a rate that the rate of the mixed feed recycle gases exceeds that limit. The recycle gas increases the rate at which gas is supplied to the thermal Claus process plant and ensures an adequate supply of gas to and flow of gas through the various units of that plant. As a result, the overall plant can also be operated with a supply of $H_2S$-containing feed gas at a rate which is only 5% or even slightly less than 5% of the maximum permissible flow rate of exhaust gas.

The "total feed gas rate" as defined above is the maximum permissible gas flow rate for the $H_2S$ containing gas in the thermal Claus plant, i.e. the rate above which there is a substantial increase in the $H_2S$ carried over into the Claus catalysis stage.

The recycle gas must be heated to 200° to 400° C. and preferably to 250° to 350° C. before it is mixed with the feed gas in order to ensure that the mixed feed and recycle gases supplied to the thermal Claus process plant are at the ignition temperature which is required for a rapid combustion. The recycled gas contains also sulfur vapor, which could condense and solidify and could thus result in a clogging if it were at an excessively low temperature. The recycle gas may be heated by a utilization of waste heat or by means of extraneous energy.

In accordance with a further development of the process, gaseous fuel and water vapor are supplied to the combustion chamber of the thermal Claus stage simultaneously with the recycle gas. It is known to supply fuel gas to the combustion chamber of the thermal Claus process plant in order to heat the same and thus to heat also the Claus process catalysis plant which follows that combustion chamber. But the gaseous fuel which is now used serves mainly to effect a sustaining combustion if the $SO_2$-containing feed gas is supplied at a greatly reduced rate. That sustaining combustion is required because the recycle gas has no appreciable calorific value. But the sustaining combustion involves the risk of an entrainment of soot by the mixed $H_2S$ and $SO_2$ gases supplied to the Claus process catalysis plant. That soot will be found in the separated sulfur and will change the latter in color so that the sulfur is less suitable for further processing. For this reason the sustaining combustion must be carried out with an addition of water vapor, which will suppress the formation of soot. 1 to 3 kg water vapor for suppressing a formation of soot are usually added per kg of gaseous fuel.

The water vapor required for a soot-free combustion in the combustion chamber of the thermal Claus process plant may also be supplied in the form of exhaust gases which contain water vapor and which are processed in that manner. For instance in refineries, a water vapor-containing gas which becomes available in the purification of gas and consists, e.g. of acid water or sour water stripper gas, can be used for the sustaining combustion.

BRIEF DESCRIPTION OF THE DRAWING

The above and other objects, features and advantages of the present invention will become more readily apparent from the following description, reference being made to the accompanying drawing in which.

SPECIFIC DESCRIPTION

The $H_2S$-containing feed gas to be processed is supplied to the thermal Claus process plant 3 through a line 1, which includes a flow rate analyzer 2.

Figure 1:
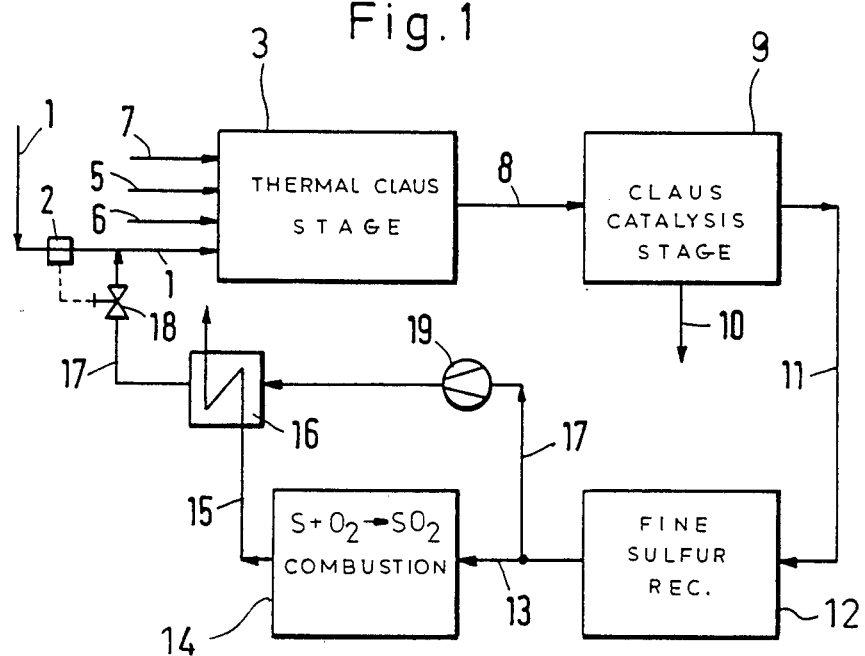
FIG. 1 is a diagrammatic representation of the process in flow-diagram form.
Figure 2:
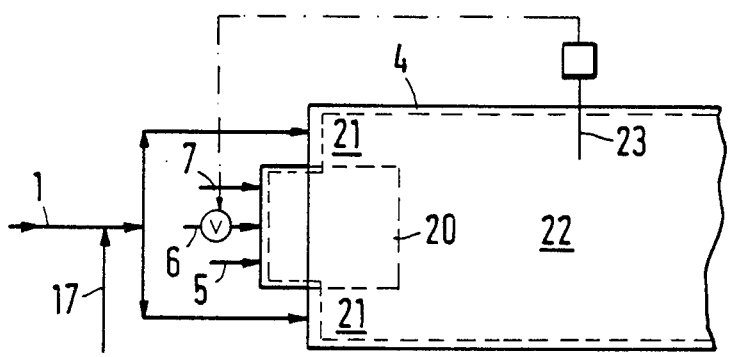
FIG. 2 is a diagrammatic view showing the combustion chamber of the thermal Claus process stage or plant.

FIG. 2 is a simplified representation of the burner 4, which constitutes the heart of the plant 3. A line 5 for air, a line 6 for gaseous fuel and a line 7 for water vapor lead also to the plant 3. The temperatures generated by the combustion in the thermal Claus process plant are in the range from 850° to 1350° C.

The process gas which has been produced and cooled in plant 3 flows at temperatures in the range of 260° to 300° C. in line 8 to the catalytic Claus process step of plant 9 which, for short, is called the Claus catalysis plant. The Claus catalysis stage or plant plant 9 is a multistage plant, in which elemental sulfur is produced, the sulfur being withdrawn in line 10.

The exhaust gas from the Claus catalysis plant 9 is supplied in line 11 to the fine purification stage of a desulfurizing plant 12. In dependence on the fine purification process employed, the exhaust gas from the plant 12 has a sulfur content not in excess of 100 to 1000 ppmv. As a result, the feed gas from line 1 has been desulfurized by at least 99%. All or part of the exhaust gas from plant 12 is supplied in line 13 to a thermal aftertreating unit 14, in which the sulfur compounds are completely burnt to form $SO_2$. The $SO_2$-containing exhaust gas from the aftertreating unit 14 is withdrawn in line 15 and delivers part of its sensible heat in the heat exchanger 16.

As the rate of feed gas in line 1 may exhibit strong fluctuations, recycle gas from line 17 must be admixed to the feed gas in line 1 when said feed gas is being supplied at a rate which is below a certain limit, which is in the range from 20 to 35% of the maximum rate. That recycle gas is a partial stream of the exhaust gas from line 13 and the rate of recycle of said partial stream is controlled by the analyzer 2 via a control valve 18. The recycle gas in line 17 is conveyed by a blower 19 and is virtually free from oxygen and contains less than 100 ppm sulfur.

The operation of the burner 4 which is associated with the thermal Claus process plant will be explained with reference to FIG. 2.

When the rate of $H_2S$-containing feed gas in line 1 has dropped to such a low level that recycle gas from line 17 must be admixed, a sustaining combustion will usually be required, too.

That sustaining combustion is carried out in an inner combustion chamber 20, which is supplied by line 5 with air or oxygen-enriched air, by line 6 with the required gaseous fuel and by line 7 with water vapor. A substoichiometric combustion in the inner combustion chamber 20 is desired. The mixed feed and recycle gases are supplied to the annular space 21 surrounding the inner combustion chamber 20. The combustion products of the inner combustion chamber 20 and of the annular chamber 21 mix in the mixing chamber 22 of the burner 4. The temperatures in said mixing chamber 22 are between 850° and 1350° C.

The temperature is controlled by means of a thermocouple 23, which is used, e.g. to control the supply of fuel gas in line 6. But that control may also be effected by an operator. The combustion in the inner combustion chamber 20 ensures that the gaseous fuel used for sustaining combustion will be burnt without the formation of soot before that fuel is contacted with sulfur-containing gas. As a result, yellow sulfur, which is virtually free of soot, can be produced in the Claus catalysis plant.

SPECIFIC EXAMPLE

A plant which corresponds to that shown on the drawing and is designed for a maximum feed gas rate of 3200 $sm^3/h$ is supplied with feed gas at a rate of 160 $sm^3/h$, i.e., at 5% of the maximum rate. That feed gas has the following composition:

| | |
|---|---|
| $H_2S$ | 82.73 vol. % |
| $CH_4$ | 0.06 vol. % |
| $C_{2+}$ | 0.10 vol. % |
| $CO_2$ | 17.08 vol. % |
| $N_2$ | 0.03 vol. % |

Recycle gas rate at a rate of 530 $sm^3/h$ is admixed from line 17 to that feed gas so that the rate of the mixed gases amounts to 21.5% of the maximum rate.

The recycle gas has the following composition on a dry basis:

| | |
|---|---|
| $N_2$ | 94.1612 vol. % |
| $CO_2$ | 3.2000 vol. % |
| $H_2$ | 2.5000 vol. % |
| Trace elements | 0.1388 vol. % |

The trace elements consist of:

| | |
|---|---|
| $SO_2$ | 407 ppmv (volume parts per million) |
| $H_2S$ | 814 ppmv |
| COS | 24 ppmv |
| $CS_2$ | 3 ppmv |
| elemental sulfur | 140 ppmv |

The recycle gas contains about 38 vol. % water.

The thermal Claus process plant 3 is also supplied with:

| | |
|---|---|
| air through line 5 | 350 $sm^3/h$ |
| fuel gas through line 6 | 50 $sm^3/h$ |
| water vapor through line 7 | 100 kg/h |

The supply of air involves a substoichiometric combustion because its rate is only 72% of the stoichiometrically required air rate. The Sulfreen process, known per se, is carried out in the desulfurizing plant 12. The sulfur has a bright yellow color.

We claim:

1. In a process for removing hydrogen sulfide from an $H_2S$-containing feed gas by the Claus process and for producing elemental sulfur, wherein the feed gas is partially burnt with an oxygen-containing gas in a thermal Claus process plant having at least one combustion chamber in which a temperature in the range of 850° to 1350° C. is maintained, a process gas produced in said combustion chamber is passed through a Claus catalysis plant from which sulfur is withdrawn, exhaust gas from the Claus catalysis plant is supplied to a desulfurizing plant, and exhaust from said desulfurizing plant is at least partially subject to a thermal aftertreatment to convert sulfur compounds contained in the exhaust gas from the desulfurizing plant to $SO_2$ to produce an $SO_2$-containing exhaust gas, the improvement which comprises in combination:

the rate of supply of the $H_2S$-containing feed gas in said thermal Claus process plant is measured;

a recycle gas consisting of recycled exhaust gas from the desulfurizing is admixed with said $H_2S$-containing feed gas when the thus-measured feed rate of the latter is below a limit in the range from 20 to 35% of a total feed gas rate which is permissible for the thermal Claus process plant;

the recycle gas is thus admixed at such a rate that the rate of the mixed feed and recycle gases exceeds that limit;

the recycle gas is heated to 200° to 400° C. before it is mixed with the feed gas; and interrupting admixture of said exhaust gas with said feed gas and subjecting all said exhaust gas to said thermal aftertreatment as long as the rate of said feed gas exceeds said limit.

2. The improvement defined in claim 1 wherein the recycle gas is heated to 250° to 350° C.

3. The improvement defined in claim 1 wherein the recycle gas is heated by indirect heat exchange with the $SO_2$-containing exhaust gas from the thermal aftertreatment.

4. The improvement defined in claim 1, further comprising the step of supplying gaseous fuel and water vapor to the combustion chamber.

5. The improvement defined in claim 4 wherein 1 to 3 kg water vapor per kg of fuel are supplied to the combustion chamber.

6. The improvement defined in claim 4 wherein an exhaust gas which contains water vapor and combustible components is supplied to the combustion chamber.

* * * * *